United States Patent [19]
Middleton et al.

[11] Patent Number: 5,601,715
[45] Date of Patent: Feb. 11, 1997

[54] MUTLI-STAGE GREASE TRAP FILTER AND SKIMMER

[75] Inventors: Dennis G. Middleton, Altoona; Robert J. Starr, Tyrone, both of Pa.

[73] Assignee: New Pig Corporation, Tipton, Pa.

[21] Appl. No.: 525,288

[22] Filed: Sep. 8, 1995

[51] Int. Cl.$^6$ .................................................... B01D 35/28
[52] U.S. Cl. .......................................... 210/469; 210/470
[58] Field of Search ................................ 210/169, 232, 210/435, 445, 455, 469, 242.3, 470, 538, 167; 55/493, DIG. 31, DIG. 36

[56] References Cited

U.S. PATENT DOCUMENTS

| | | | |
|---|---|---|---|
| 452,044 | 5/1891 | Doolittle | 210/470 |
| 1,066,788 | 7/1913 | Bowen | 210/470 |
| 3,857,787 | 12/1974 | Kinne | 210/470 |
| 4,231,769 | 11/1980 | Ahlrich | 55/493 |
| 4,762,053 | 8/1988 | Wolfert | 55/493 |
| 4,963,170 | 10/1990 | Weber et al. | 55/493 |
| 5,075,000 | 12/1991 | Bernard et al. | 55/DIG. 55 |
| 5,154,161 | 10/1992 | Rogers et al. | 55/DIG. 36 |
| 5,196,040 | 3/1993 | Malloy et al. | 55/DIG. 36 |
| 5,458,772 | 10/1995 | Eskes et al. | 210/416.5 |

*Primary Examiner*—W. L. Walker
*Attorney, Agent, or Firm*—Buchanan Ingersoll, P.C.; Robert J. Pugh

[57] ABSTRACT

An apparatus for removing grease from a compartmental grease trap that has water provided therewithin so that grease forms a layer atop the water in the trap. The apparatus has a mounting portion that is securable to the grease trap and a housing portion pivotally connected to the mounting portion. A filter media is then secured by the housing portion. The housing portion is preferably constructed from a framing structure and an inner structure. The framing structure has two sets of opposed sidewalls and a perforated or mesh bottom sheet that allows water to pass therethrough. The inner structure is separably secured to the framing structure, such as by pivotal connection and the filter media is preferably held between the inner structure and the framing structure. The inner structure is capable of being locked into position with respect to the framing structure by a locking device. The housing portion may be caused to pivot relative to the mounting portion such as by a linkage, preferably a solid rod, connected at one end to the housing portion and accessible at an opposite end by an operator.

31 Claims, 4 Drawing Sheets

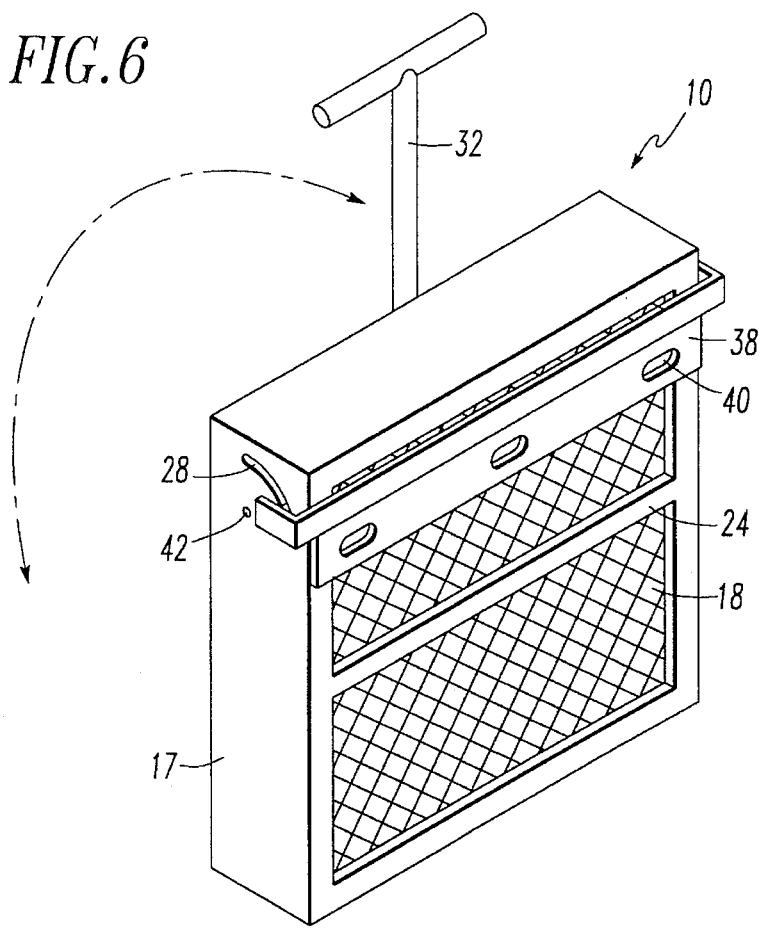
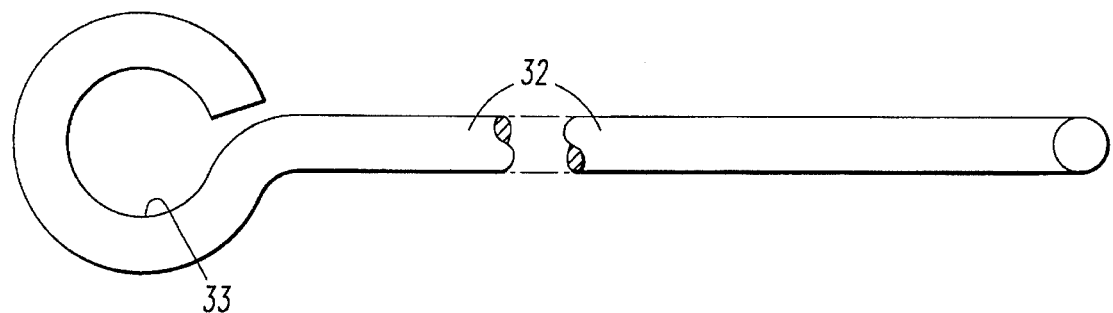

MUTLI-STAGE GREASE TRAP FILTER AND SKIMMER

BACKGROUND OF THE INVENTION

1. Field of the Invention

This invention relates generally to methods and apparatus for removing grease from grease traps and more particularly to a filter and skimmer for use in compartmental grease traps.

2. Description of the Prior Art

For any industry in which grease and/or oils are used, those oils and grease must be discarded. Typically, this is done through the use of grease traps. A popular type of grease trap is the "Weir Type" or compartment grease trap. Weir Type grease traps have compartments where the grease is held. The grease trap compartments are bordered by vertical sidewalls. These compartment grease traps are typically in ground and are located within close proximity of the grease and oil source. Water is present in the grease trap and grease and oil are entered into tile influent water in the grease trap. When such grease traps are used, the grease and oil (which are generally referred to collectively as "grease") float to the top of the water in the grease trap and must be removed from the influent water before being discharged into the waste water stream and ultimately to the waste water treatment facility.

Once the grease is entered into the grease trap, the grease separates from the water and floats atop the water. The floating grease must then be removed from the grease trap. Floating grease has been removed from the grease traps in the prior art by various techniques. Perhaps the most commonly utilized technique is to scoop out the floating grease through the use of a bucket or some other container. This technique offers the disadvantage of being time intensive and tends to be "messy" in that it usually subjects the operator to contact with the grease. Also, because the bucket entered the grease trap from above the grease, the bucket could temporarily mix the grease and cause some of the grease to temporarily move lower in the grease trap water so as to avoid removal. Further, the scoop out technique also withdraws a substantial amount of the water from the grease trap along with the grease.

Another commonly used technique for removing grease from a grease trap is the siphoning of the grease through the use of a vacuum. Vacuums have motors and other moving parts which are prone to failure. Furthermore, vacuums also tend to withdraw a substantial amount of water along with the grease when utilized.

A more recent technique has been bioremediation. Bioremediation involves the use of organisms which are introduced into the grease trap to digest the grease. Bioremediation requires additional room for off load tanks for the microorganisms to process the grease (known as residence time). Additional space is often unavailable, and in any event, the use of additional space for grease processing is generally undesirable.

Thus, a grease removal system is needed that does not require additional space, may be utilized with the existing grease trap structure, is not prone to breakdown, is not time intensive and does not remove water from the grease trap along with the grease.

SUMMARY OF THE INVENTION

An apparatus is provided for removing grease from a grease trap. The grease trap contemplated for use with the present invention has at least one compartment that is bordered and defined by two sets of opposed, vertical sidewalls and a bottom wall. A fluid, preferably water, is then provided within the grease trap compartment and grease is also entered into the grease trap compartment such that the grease forms a layer generally atop the fluid through separation.

The apparatus removes the layer of grease from the grease trap by filtering and skimming the layer of grease. The apparatus has a mounting portion that is securable to the grease trap by being secured to at least one of the vertical side walls of the grease trap compartment. The mounting structure is preferably an elongated mounting plate that is matable with one of the grease trap compartment vertical side walls.

The elongated mounting plate is preferably secured to the vertical side wall by having one or more openings provided through the mounting plate that are each alignable with a respective opening through the vertical side wall, and a screw, bolt, rivet, pin or similar securing means is then disposed through each pair of aligned openings.

Alternatively, the elongated mounting plate may be secured to the vertical side wall by means of the mounting plate having an overhang portion provided thereon, in which the overhang portion is placed upon a vertical side wall.

A housing portion is then pivotally connected to the mounting portion. The housing portion is preferably pivotally connected to the mounting portion by means of one or more, and preferably two, pins being connected to the mounting portion and the pins being disposed through one or more, and preferably two, apertures of the housing portion. The pins may be welded or otherwise affixed to the mounting portion or may instead be disposed through openings in the mounting portion. The apertures of the housing portion are preferably arcuate in shape.

Alternatively, the pins may be connected to the housing portion and disposed through apertures in the mounting portion. Moreover, the housing portion may be pivotally connected to the mounting portion by means of a hinge connected to the housing portion and the mounting portion.

A filter media is then secured to the housing portion. The housing portion is preferably constructed from a framing structure and an inner structure. The framing structure has two sets of opposed sidewalls and a perforated or mesh bottom sheet that allows water to pass therethrough. The inner structure is connected to the framing structure. Preferably, the inner structure is separably connected to the framing structure. The preferred means for separably connecting the inner structure to the framing structure is by pivotally securing the inner structure to the framing structure. In this way, the inner structure may be pivoted so as to be proximate the perforated mesh bottom sheet of the framing structure or may be pivoted so as to substantially separate from the mesh bottom sheet of the framing structure. The filter media is preferably secured to the housing portion by being provided between the framing structure and the inner structure. Thus, when the inner structure is pivoted away from the framing structure, the filter media may be inserted upon the framing structure. Then, the inner structure if pivoted back towards the bottom sheet of the framing structure so as to contain the filter media therebetween. When the inner structure is pivoted towards the bottom sheet of the framing structure, the inner structure is capable of being locked into position with respect to the framing structure by means of a locking device. The locking device preferably includes a spring biased detent.

The framing structure and the inner structure are preferably fabricated of stainless steel, but may be made of any suitable material such as coated steel, plastic, aluminum and aluminum alloys. The filter media is preferably made of an open celled material. Polyester and polypropylene are preferred, but any suitable material that will allow water to pass through but will not allow the grease to pass through may be used.

The apparatus is also equipped with a means for causing the housing portion to pivot relative to the mounting portion. The preferred means for pivoting the housing portion is an elongated linkage connected at one end to the housing portion and accessible at an opposite end by an operator. When pulled and released, the linkage will cause the housing portion to pivot relative to the mounting portion. The linkage is preferably a rigid member such as a rod, but may also be a flexible linkage such as a chain, or may be any other convenient linkage that can withstand the environment of the grease trap.

Other objects and advantages of the invention will become apparent from a description of certain present preferred embodiments thereof shown in the drawings.

BRIEF DESCRIPTION OF THE DRAWINGS

FIG. 6 is a view similar to FIG. 5 in which the filter housing has been pivoted 90° relative to the mounting assembly.

FIG. 7 is a side view, broken, of a preferred actuation member of the filter and skimming apparatus.

DETAILED DESCRIPTION OF THE PREFERRED EMBODIMENTS

Figure 1:
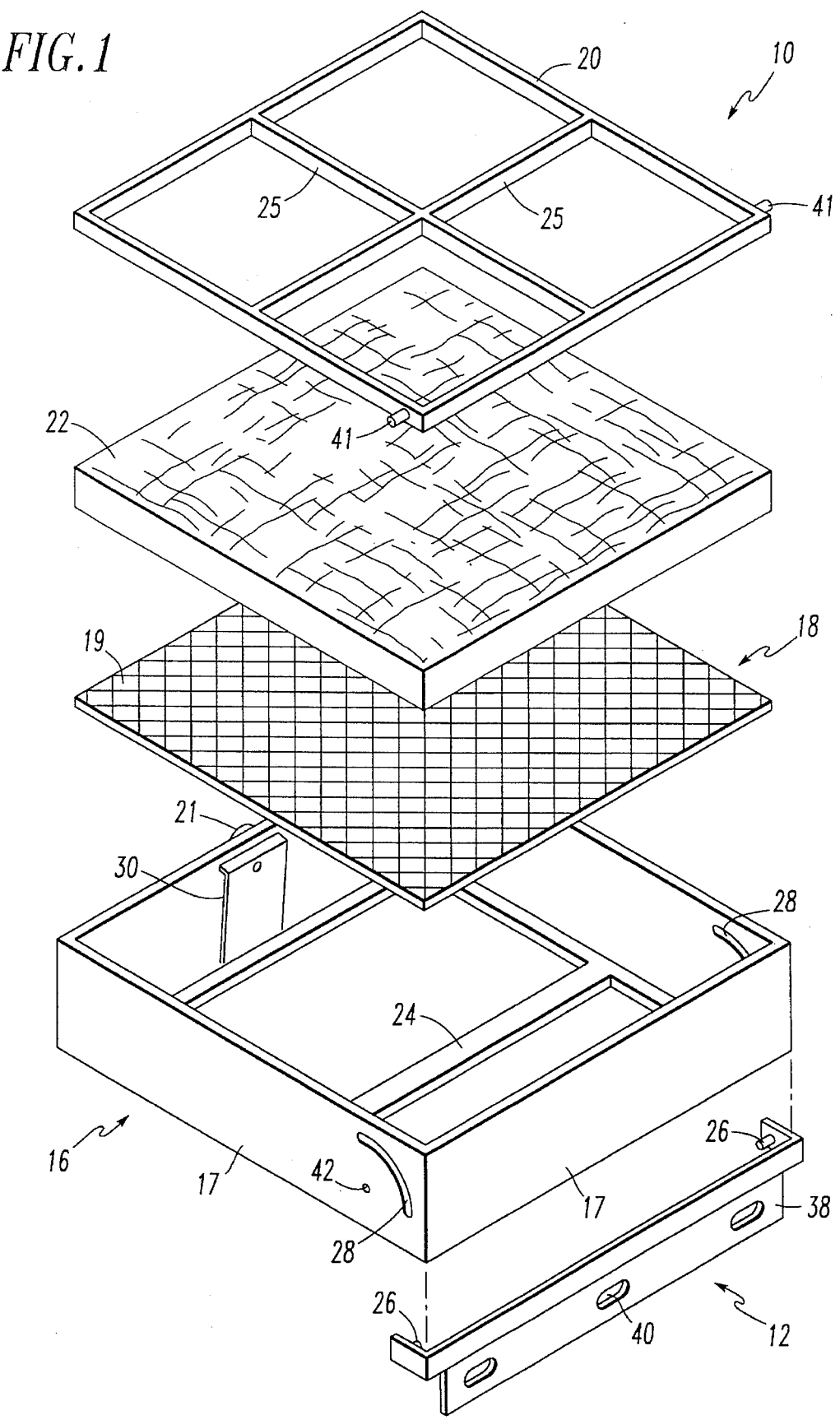
FIG. 1 is an exploded perspective view of a preferred filtered skimming apparatus.

Referring first to FIG. 1, an exploded, perspective view of a preferred filter and skimming apparatus 10 is shown for removing grease from grease traps. The apparatus 10 has a mounting assembly 12 that is mounted to the grease trap (not shown in FIG. 1), preferably by being secured to a vertically oriented sidewall of the grease trap structure as will be described in greater detail below.

Figure 2:
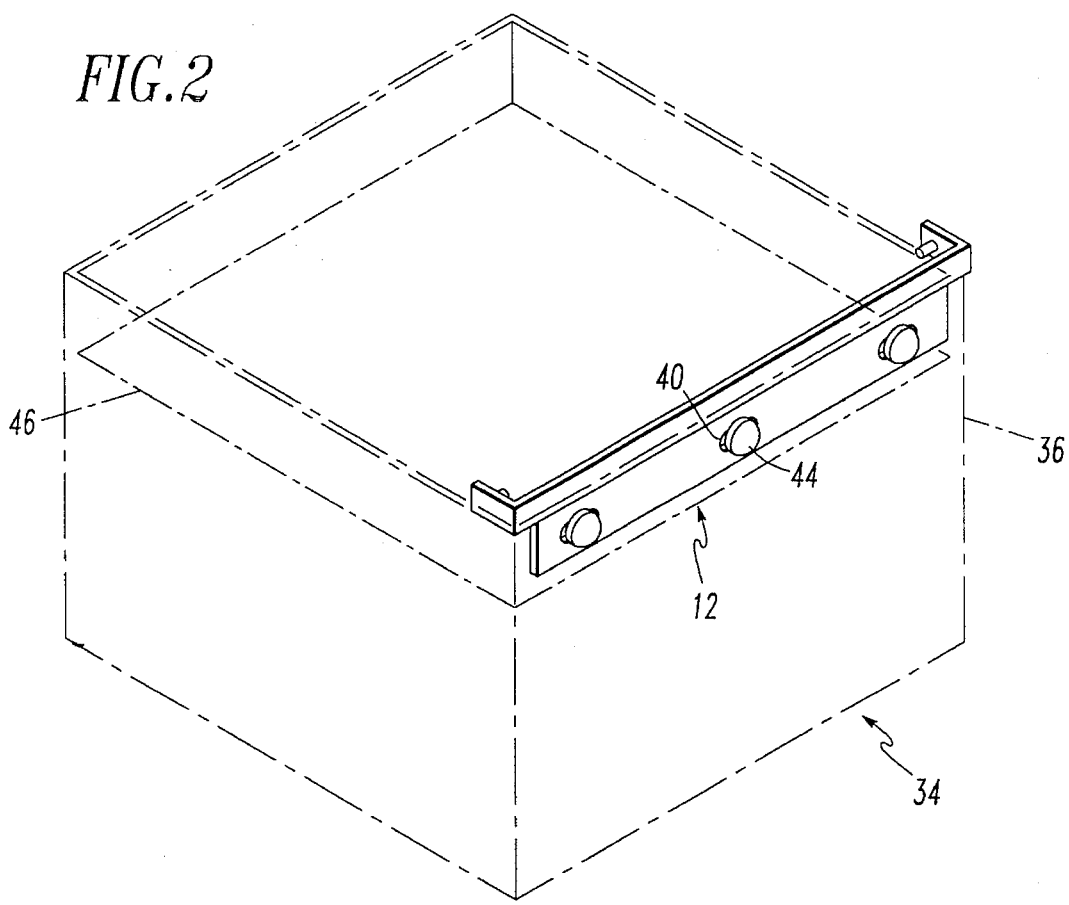
FIG. 2 is a perspective showing a prior art grease trap compartment with the mounting assembly of the preferred filter and skimming apparatus mounted thereto.

Referring next to FIG. 2, a prior art compartmental grease trap structure 34 is shown in dotted line having a mounting assembly 12 secured thereto. The mounting assembly is preferably made of an elongated mounting plate 38 that is matable with the grease trap compartment vertical side wall 36.

The elongated mounting plate 38 is preferably secured to the vertical side wall 36 by having one or more openings 40 provided through the mounting plate 38 that are each alignable with a respective opening through the grease trap vertical side wall 36, and a screw, bolt, rivet, pin or similar securing means 44 is then disposed through each pair of aligned openings in the mounting assembly 12 and grease trap side wall 36.

Alternatively, the elongated mounting plate 38 may be secured to the vertical side wall 36 by other suitable means, such as through the use of an adhesive substance, such as an epoxy, glue or resin, provided between the mounting plate 38 and the vertical side wall 36. Also, the elongated mounting plate may be secured to the vertical side wall by means of a clamp (not shown), preferably a spring-biased clamp. In addition, the elongated mounting plate 38 may be secured to the vertical side wall 36 by means of the mounting plate 38 having a channel or overhang portion provided thereon, in which the mounting plate channel or overhang portion engages the vertical side wall 36.

Figure 3:
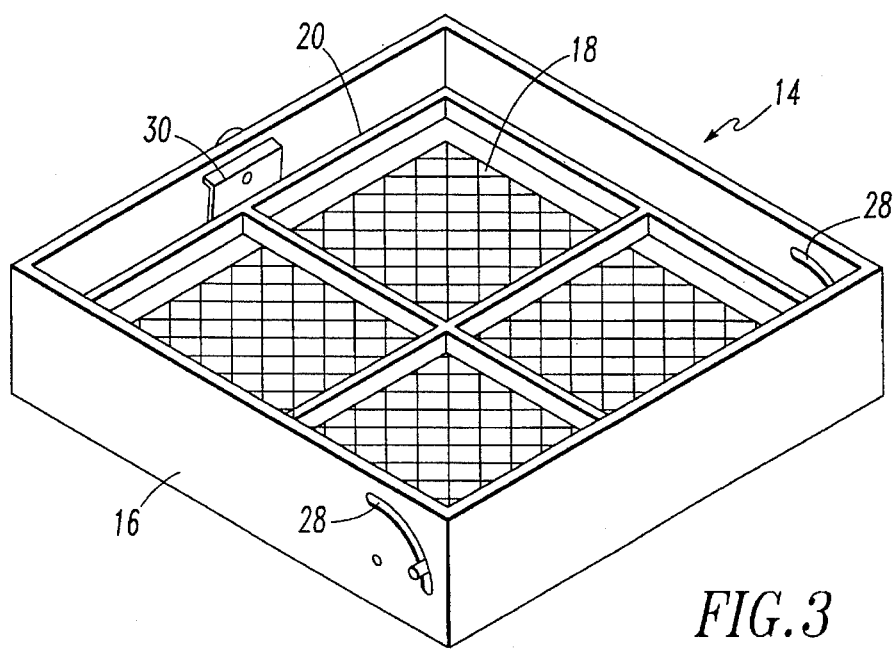
FIG. 3 is a perspective view of the preferred filter housing of the filter and skimming apparatus shown in a closed position.
Figure 4:
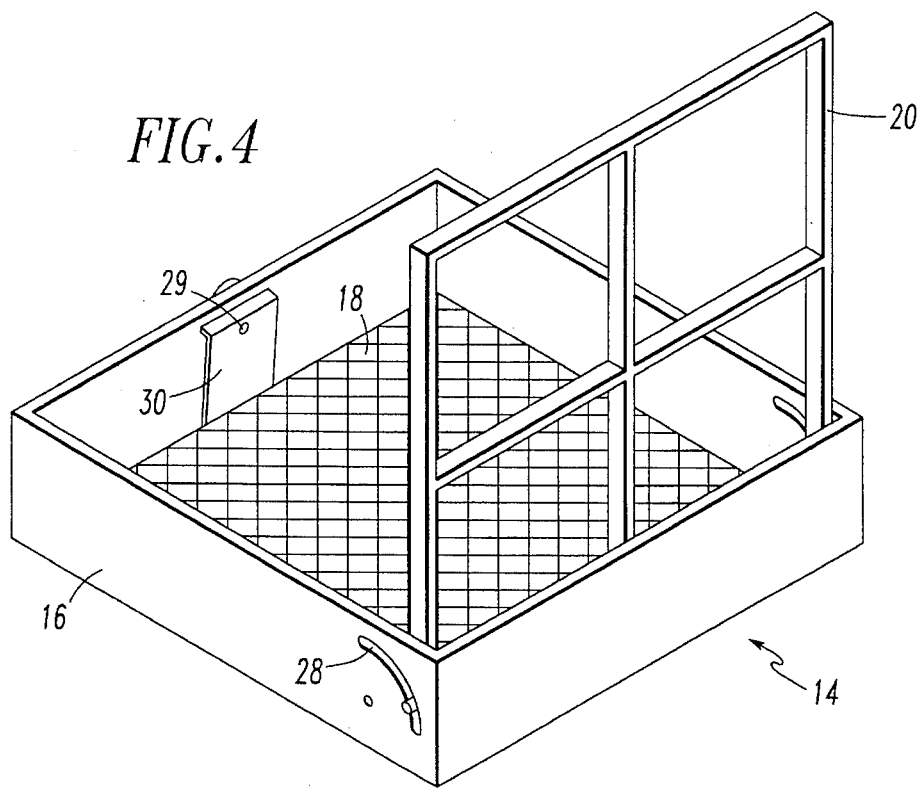
FIG. 4 is a view similar to FIG. 3 in which the filter housing is in an open position.

Referring to FIGS. 1, 3 and 4, the filter apparatus 10 preferably also has a housing 14 that is connected to the mounting assembly 12. The filter housing 14 is connected to the mounting assembly 12 such that the filter housing 14 may pivot relative to the mounting assembly 12. Any means for pivotally connecting the filter housing 14 to the mounting assembly 12 may be used, such as a hinge. However, the preferred means for pivotally connecting the filter housing 14 to the mounting assembly 12 is through two pins 26 that are connected to the mounting assembly 12 and are then disposed through apertures 28 in the filter housing 14. In this way, the pins 26 may rotate within the apertures 28 and/or the apertures 28 may rotate about the pins 26. It is preferred that the apertures 28 are arcuate so that the filter housing 14 may translate relative to the pins 26 as well as rotate about pins 26.

Although two apertures 28 are preferred for the pivotal connection of the filter housing 14 and the mounting assembly 12, a single aperture 28 may also be used. Similarly, although two pins 26 are preferred, a single pin 26 may connect to the filter main body and cooperate with the apertures 28. Pins 26 may be connected to the filter housing 14 by being welded thereto or by being disposed through openings of the filter housing 14.

A preferred embodiment of the filter housing 14 is described herein. However, it is distinctly understood that any filter housing structure may be utilized which may hold a filter media, allow water to pass therethrough and that can pivot relative to a mounting.

The preferred filter housing 14 has a framing structure 16 having two sets of opposed sidewalls 17. Along the bottom of the framing structure 16 is placed a porous open mesh or perforated bottom sheet 18 that provides structural support to the framing structure 16, yet allows water to easily pass through the openings or perforations 19. The bottom sheet 18 is preferably affixed into position upon the framing structure 16, such as by being welded thereto. One or more supporting members 24 may be provided on the framing structure 16 to assist in supporting the bottom sheet 18 and providing additional locations to affix the bottom sheet to the framing structure 16.

An inner structure 20 is then secured to the framing structure 16. The inner structure 20 helps to hold the filter media 22. The filter media 22 may be held by being secured directly to the framing structure 16, by being secured directly to the inner structure 20, or preferably by being secured between the inner structure 20 and the framing structure 16 of the filter housing 14.

The inner structure 20 is preferably separable from the framing structure 16. The preferred means for making the inner structure 20 separable from the framing structure 16 is by pivotally securing the inner structure 20 to the framing structure 16. The inner structure 20 and the framing structure 16 may be pivotable with respect to one another by any convenient means. However, the preferred means for pivotally connecting the inner structure 20 to the framing structure 16 is through two pins 41 that are connected to the inner structure 20 and are then disposed through respective apertures 42 through the framing structure 16. In this way, the pins 41 may rotate within the apertures 42 and/or the apertures 42 may rotate about the pins 41. Although two pins 41 and two apertures 42 are preferred, it is understood that a single pin may be used or a single aperture. In fact, any convenient means may be used for pivoting the inner structure 20 and the framing structure 16 relative to one another may be employed.

The position of the inner structure 20 is preferably fixed relative to the framing structure 16 by means of a locking device 30. The locking device preferably includes a spring-biased detent 29. Detent 29 is normally spring-biased outward so as to obstruct the path of inner structure 20 from pivoting away from the perforated bottom sheet 18. When a sufficient force is applied to the detent 29, the bias of the spring is overcome and the detent is moved so as not to obstruct the path of the inner structure 20, thus enabling inner structure 20 to pivot away from the perforated bottom sheet 18. It is understood, however, that any means for locking or securing the position of inner structure 20 relative to the framing structure 16 may be utilized.

Thus, the filter media 22 is preferably contained between the inner structure 20 and the framing structure 16 of the filter housing 14. When the inner structure 20 is pivoted towards the perforated bottom sheet 18 and is secured into position by locking device 30, the relative positions of the inner structure 20 and the framing structure 16 are fixed, and when a filter media 22 is placed between the inner structure 20 and the framing structure 16 the position of the filter media 22 is also fixed within the filter housing 14.

With the inner structure 20 thus fixed into position relative to the framing structure 16 by the locking device 30, the filter housing 14 is said to be in a "closed" position as shown in FIG. 3. Inner structure 20 is further preferably provided with support members 25 which assist in retaining the filter media 22 between the inner structure and the framing structure 16 while allowing water to pass through inner structure 20. Although two inner structure support members 25 are shown in an "X" orientation, any number or configuration of support members may be utilized so long as water is allowed to pass therethrough.

When the locking device 30 is disengaged, e.g., such as by applying a force to the spring-biased detent 29 to overcome the spring bias, the inner structure 20 may be pivoted away from perforated bottom sheet 18 as shown in FIG. 4. With the filter housing 14 thus being in an "open" position, the filter media 22 may be removed, replaced, inserted, or reinserted. Once the filter media 22 is replaced between the framing structure 16 and the inner structure 20, the inner structure 20 may be pivoted toward the bottom sheet 18 and locked into position by locking device 30 so that the device 10 is ready for operation.

Figure 5:
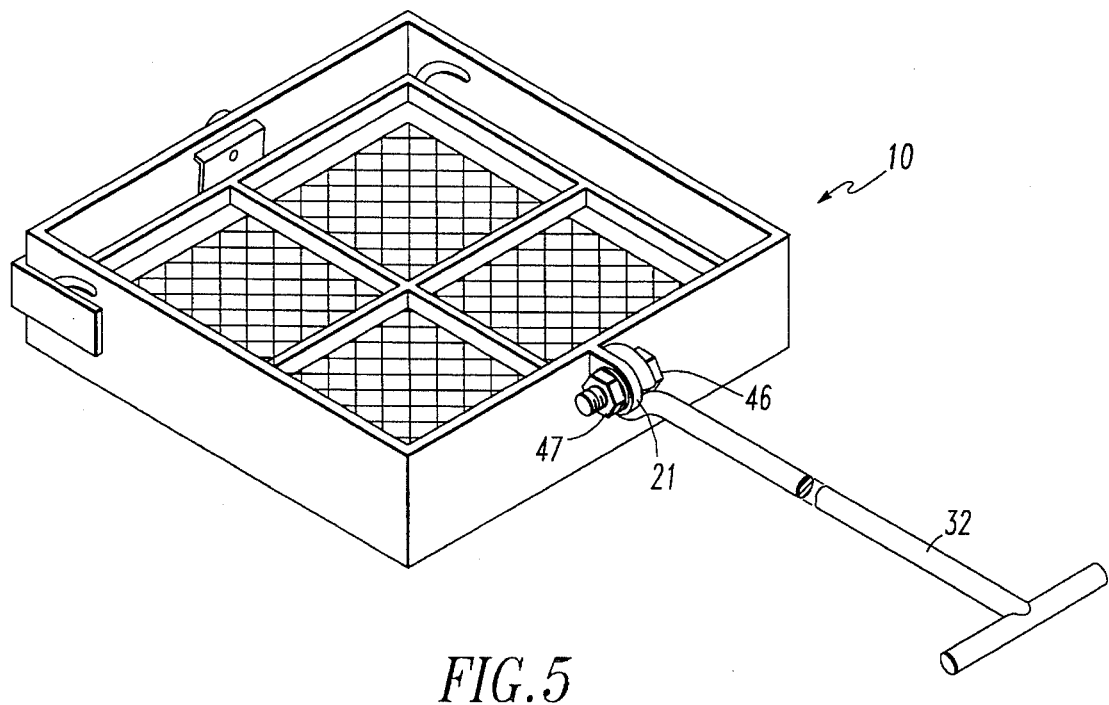
FIG. 5 is a perspective view of the preferred filter and skimming apparatus.

Referring next to FIGS. 1, 5 and 6, when assembled, the filter housing 14 which houses the filter media 22 is pivotable relative to the mounting assembly 12. Since the mounting assembly 12 is secured to the grease trap vertical compartment wall 36, the filter housing 14 is thus movable relative to the grease trap 34.

A portion of the filter housing 14 opposite to the portion of the filter housing 14 that is pivotally connected to the mounting assembly 12 has an actuation member 32 attached to it. The actuation member 32 is preferably an elongated rod that is attached to the filter housing 14, such as through the use of a bolt 46 having a nut 47, wherein the bolt 46 is disposed through an opening 33 in the actuation member 32 (shown best in FIG. 7) and through one or more holes 31 in the framing structure 16. In this way, the actuation member 32 is pivotably connected to filter housing 14. It is understood, however, that any suitable means of connecting the actuation member 32 to the filter housing 14 may be used. When the actuation rod 32 is pulled and released by an operator, the filter housing 14 which holds the filter media 22 is caused to pivot relative to the grease trap compartment 34 providing the filter housing 14 with a skimming motion. Although the actuation member 32 is preferably a rigid member, such as a rod, the actuation member 32 may be any suitable linkage which can transmit the force needed to operate the pivoting of the grease trap compartment 34 and withstand the environment of the grease trap. For example, a flexible linkage, such as a chain, could be utilized. Furthermore, it is preferred that the hole 31 in the framing structure 16 be provided through a portion 21 of the framing structure 16 which extends outward from the framing structure wall 17. However, the hole 31 may instead be provided directly through the framing structure wall The filter media 22 is preferably constructed of one or more open celled materials. Suitable materials for use as the filter media 22 include polyester, polypropylene or any hydrophilic or open celled hydrophilic material. The filter and skimming apparatus 10, except for the filter media 22, is preferably fabricated from 304 stainless steel. However, other materials may be used such as plastic, aluminum, coated steel, alloys and any other material that is capable of resisting oxidation and/or chemical breakdown from the environment of the grease trap 34 and that is also capable of withstanding the high temperatures present in the grease trap 34 environment.

Preferably, the length and width dimensions of the housing 14 of the filter and skimming apparatus 10 are slightly less than the length and width dimensions of the grease trap compartment 34 in which the filter and skimming apparatus 10 is employed. The depth dimension of the housing 14 of the filter and skimming apparatus 10 is roughly equivalent to the thickness of the particular filter media 22 employed by the filter and skimming apparatus 10. The thickness of the filter media 22 is in turn dependent upon the amount and type of grease that is required to be extracted from the grease trap 34.

In operation, when the filter housing 14 is initially secured to the mounting assembly 12 and no external force is applied to the filter device 10, the filter housing 14 hangs downward so as to be essentially parallel to the vertical sidewall 36 of the grease trap compartment 34, which position is depicted in FIG. 6. Then, when the filter housing 14 is caused to rotate about the mounting assembly 12, such as by an operator pulling on the actuation linkage 32, the filter housing 14 swings upward from below the layer of grease 46. The filter media 22, which is held by the filter housing 14, is thus able to skim the grease out from the water. The filter housing 14 may be pivoted at least to a position essentially perpendicular to the vertical side wall 36 of the grease trap compartment 34, which position is depicted in FIG. 5. The water passes through the filter media 22 and through the mesh openings 19 in the bottom wall 18 of the framing structure 16.

Despite the housing 14 of the filter device 10 being sized approximately the same as the compartment of the grease trap 34, the filter housing 14 is able to avoid being stuck against the grease trap compartment walls 36 during the pivoting of the filter housing 14 due to the arcuate apertures 28 of the pivotal connection 24. The pins 26 which are disposed through apertures 28 are able to translate along the apertures 28.

While certain present preferred embodiments have been shown and described, it is distinctly understood that the invention is not limited thereto but may be otherwise embodied within the scope of the following claims.

We claim:

1. An apparatus for removing grease from a grease trap, wherein the grease trap has at least one compartment that is bordered and defined by two sets of opposed, vertical side walls, so as to have a length and a width, and by a bottom, and wherein a fluid having a selected viscosity is provided within the grease trap compartment and grease having a selected viscosity is also entered into the grease trap compartment such that the grease forms a layer generally atop the fluid, the apparatus comprising:

a mounting portion that is securable to at least one vertical side wall of the grease trap compartment;

a housing portion that is pivotally connected to the mounting portion, wherein the housing portion has a length and width substantially similar to that of the grease trap compartment;

a filter media that is attached to the housing portion; and means for pivoting the housing portion relative to the mounting portion, the pivot means including at least one pin being connected to the mounting portion and the at least one pin being disposed through at least one arcuate aperture of the housing portion, wherein the at least one pin may travel along the arcuate aperture when the housing portion is pivoted such that the housing portion may pivot from a position below the layer of grease through a position above the layer of grease such that the filter media skims the layer of grease.

2. The apparatus of claim 1 wherein the housing portion is comprised of:

a framing structure having two sets of opposed sidewalls and a perforated bottom sheet; and an inner structure secured to the framing structure that holds the filter media.

3. The apparatus of claim 2 wherein the inner structure is separable from the framing structure.

4. The apparatus of claim 3 further comprising a locking device, wherein the locking device may secure the inner structure proximate to the framing structure bottom sheet and may be released to allow the inner structure to be separated from the bottom sheet.

5. The apparatus of claim 4 wherein the locking device includes a spring biased detent.

6. The apparatus of claim 3 wherein the inner structure is separable from the framing structure by being pivotally connected to the framing structure.

7. The apparatus of claim 2 wherein the framing structure is fabricated of a material selected from the group consisting of stainless steel, coated steel, plastic, aluminum and aluminum alloys.

8. The apparatus of claim 2 wherein the inner structure is fabricated of a material selected from the group consisting of stainless steel, coated steel, plastic, aluminum and aluminum alloys.

9. The apparatus of claim 2 wherein the filter media is held by being secured to the framing structure.

10. The apparatus of claim 2 wherein the filter media is held by being secured between the inner structure and the framing structure.

11. The apparatus of claim 1 wherein the filter media is made of an open celled material.

12. The apparatus of claim 11 wherein the filter media is made of a material selected from the group consisting of polyester and polypropylene.

13. The apparatus of claim 1 wherein the mounting structure includes an elongated mounting plate which is matable with a grease trap compartment vertical side wall.

14. The apparatus of claim 13 wherein the elongated mounting plate is secured to the vertical side wall by means of at least one pair of aligned openings on the mounting plate and the vertical side wall in which a connecting member is disposed through each such pair of aligned openings.

15. The apparatus of claim 1 wherein the at least one pin is connected to the mounting portion by being disposed through openings thereof.

16. The apparatus of claim 1 wherein the means for pivoting the housing portion relative to the mounting portion is an elongated linkage connected at one end to the housing portion and accessible at an opposite end by an operator.

17. An apparatus for removing grease from a grease trap, wherein the grease trap has at least one compartment that is bordered and defined by two sets of opposed, vertical side walls, so as to have a length and a width, and by a bottom, and wherein a fluid having a selected viscosity is provided within the grease trap compartment and grease having a selected viscosity is also entered into the grease trap compartment such that the grease forms a layer generally atop the fluid, the apparatus comprising:

a mounting portion that is securable to at least one vertical side wall of the grease trap compartment;

a housing portion that is pivotally connected to the mounting portion, wherein the housing portion has a length and width substantially similar to that of the grease trap compartment;

a filter media that is attached to the housing portion; and means for pivoting the housing portion relative to the mounting portion, the pivot means including at least one pin being connected to the housing portion and the at least one pin being disposed through at least one arcuate aperture of the mounting portion, wherein the at least one pin may travel along the arcuate aperture when the housing portion is pivoted such that the housing portion may pivot from a position below the layer of grease through a position above the layer of grease such that the filter media skims the layer of grease.

18. The apparatus of claim 17 wherein the housing portion is comprised of:

a framing structure having two sets of opposed side walls and a perforated bottom sheet; and an inner structure secured to the framing structure that holds the filter media.

19. The apparatus of claim 18 wherein the filter media is held by being secured between the inner structure and the framing structure.

20. The apparatus of claim 17 wherein the filter media is made of an open celled material.

21. The apparatus of claim 20 wherein the filter media is made of a material selected from the group consisting of polyester and polypropylene.

22. The apparatus of claim 18 wherein the inner structure is separable from the framing structure.

23. The apparatus of claim 22 further comprising a locking device, wherein the locking device may secure the inner structure proximate to the framing structure bottom sheet and may be released to allow the inner structure to be separated from the bottom sheet.

24. The apparatus of claim 23 wherein the locking device includes a spring biased detent.

25. The apparatus of claim 22 wherein the inner structure is separable from the framing structure by being pivotally connected to the framing structure.

26. The apparatus of claim 18 wherein the framing structure is fabricated of a material selected from the group consisting of stainless steel, coated steel, plastic, aluminum and aluminum alloys.

27. The apparatus of claim 18 wherein the inner structure is fabricated of a material selected from the group consisting of stainless steel, coated steel, plastic, aluminum and aluminum alloys.

28. The apparatus of claim 18 wherein the filter media is held by being secured to the framing structure.

29. The apparatus of claim 17 wherein the at least one pin is connected to the mounting portion by being disposed through openings thereof.

30. The apparatus of claim 17 wherein the mounting structure includes an elongated mounting plate which is matable with a grease trap compartment vertical side wall.

31. The apparatus of claim 19 wherein the means for pivoting the housing portion relative to the mounting portion is an elongated linkage connected at one end to the housing portion and accessible at an opposite end by an operator.

* * * * *